United States Patent
Peng

(10) Patent No.: US 10,271,163 B2
(45) Date of Patent: Apr. 23, 2019

(54) SYSTEM AND METHOD FOR ROBUST AND EFFICIENT TDOA BASED LOCATION ESTIMATION IN THE PRESENCE OF VARIOUS MULTIPATH DELAY

(71) Applicant: Semtech Corporation, Camarillo, CA (US)

(72) Inventor: Mengkang Peng, Berkshire (GB)

(73) Assignee: Semtech Corporation, Camarillo, CA (US)

( * ) Notice: Subject to any disclaimer, the term of this patent is extended or adjusted under 35 U.S.C. 154(b) by 0 days.

(21) Appl. No.: 15/244,909

(22) Filed: Aug. 23, 2016

(65) Prior Publication Data

US 2017/0156030 A1 Jun. 1, 2017

(30) Foreign Application Priority Data

Nov. 30, 2015 (EP) .................................... 15197110

(51) Int. Cl.
*H04W 4/02* (2018.01)
*H04W 64/00* (2009.01)
*G01S 5/06* (2006.01)
*G01S 5/02* (2010.01)
*H04W 4/029* (2018.01)

(52) U.S. Cl.
CPC .......... *H04W 4/023* (2013.01); *G01S 5/0268* (2013.01); *G01S 5/06* (2013.01); *H04W 4/027* (2013.01); *H04W 4/029* (2018.02); *H04W 64/00* (2013.01)

(58) Field of Classification Search
CPC ..... H04W 4/023; H04W 4/027; H04W 4/028; H04W 64/00; H04W 4/029; G01S 5/0268; G01S 5/06

USPC .............................................. 455/456.1–457
See application file for complete search history.

(56) References Cited

U.S. PATENT DOCUMENTS

| | | | | |
|---|---|---|---|---|
| 9,173,183 B1* | 10/2015 | Ray | ................... | H04W 56/0065 |
| 2009/0149202 A1* | 6/2009 | Hill | ....................... | G01S 5/0289 |
| | | | | 455/456.6 |
| 2014/0087754 A1* | 3/2014 | Siomina | ................... | H04W 4/02 |
| | | | | 455/456.1 |
| 2015/0148059 A1* | 5/2015 | Puthenpura | ........... | H04W 64/00 |
| | | | | 455/456.1 |

FOREIGN PATENT DOCUMENTS

WO WO-2014/124785 A1 8/2014

* cited by examiner

*Primary Examiner* — Michael Y Mapa
(74) *Attorney, Agent, or Firm* — Blank Rome LLP

(57) ABSTRACT

A system comprising at least a mobile device (110) and a plurality of gateways (120a-120g) whose positions are known, wherein the gateways (120a-120g) are operatively arranged to determine for each gateway a time differences of arrival (TDOA) of a signal originated by the mobile device (110). A solver unit (160) computes the position of the mobile device (110), based on said time difference of arrival (TDOA). The solver unit (160) implements ELM and a LMS algorithm to compute the mobile device's one-shot location estimate based on one or several packet transmissions, and includes a procedure to decide if an LMS algorithm needs to be run and a procedure to select or combine the location output from ELM and LMS for the one-shot location output. Further the solver unit comprises a tracking algorithm to realise the tracking of the moving device or to improve location accuracy should the device static.

11 Claims, 3 Drawing Sheets

SYSTEM AND METHOD FOR ROBUST AND EFFICIENT TDOA BASED LOCATION ESTIMATION IN THE PRESENCE OF VARIOUS MULTIPATH DELAY

REFERENCE DATA

The present application claims priority of European patent application EP15197110.8 of Nov. 30, 2015, the contents whereof are incorporated by reference in their entirety.

TECHNICAL FIELD

Embodiments of the present invention relate to the field of determining a position of a mobile electronic device.

BACKGROUND

In IOT (Internet of Thing) and many other location related applications, it is required that an infrastructure be able to estimate the position of one or several wireless objects or target nodes. In a typical location estimation system, there are several reference nodes, or gateways, whose locations are known, and one or several target nodes or motes, whose locations are to be estimated.

In order to estimate the location of a target node, some metrics characterising the positioning information of the target node against the reference nodes, such as the distance or angles, needs to be measured through either radio transmission by the target node and reception by the reference nodes, or the other way around.

The present document will consider mostly, for simplicity, the case where the target node makes radio transmission, which is received by gateways (reference nodes) with the packet's Time of Arrival (TOA) being time-stamped. It must be understood, however, that the invention is applicable also, with appropriate modifications, to the case in which several gateways send simultaneous packets, or packets that are in a determined time sequence, which are received by the target node which, based on the knowledge of their TOA, determine its own position.

Also, the following description describes examples of the invention in which the position of the mobile node is determined in a 2-dimensional plane. Albeit important, this application is not limiting and the invention includes as well variants in which the mobile nodes are localised in a 3-dimensional space.

As known for those skilled in the art, TDOA (Time Difference of Arrival) methods can be used to compute the location if all the gateways are synchronised, but the target node is not. The gateways can be synchronised through either GPS or other synchronisation mechanism. TDOA methods generally involve the determination of the difference between the arrival times of the same packet transmission to two different gateways, which is related, through the known propagation speed, to the difference of the distances from the transmitting node to the two gateways.

Also as known for those skilled in the art, the presence of multipath delay could introduce severe variation and bias on the measurement of TOA and TDOA, which leads to a serious degradation of location accuracy. In a practical environment, either indoor or outdoor, it is most likely that the some or all the gateways may endure a certain level of multipath transmission delay. It is also quite likely that some of the gateways may suffer from heavier multipath delay spread than others. Like other channel-related phenomena, multipath-induced biases on the time of arrival, are difficult to model and estimate.

Localisation estimation system can be generally divided into two categories, i.e.: range-based and range-free methods. TDOA range-based localisation is widely used to achieve good location accuracy. All gateways are assumed to be synchronised, either through GPS or other synchronisation mechanism, however, the target node does not need to be synchronised to gateways. The target node transmits a packet, which is received and time-stamped by gateways to obtain TOA values per each receiving gateway or antenna.

As known for those skilled in the art, at least two TDOA from three different receiving gateways are needed in order to produce a unique estimate of the location of the target node. In some cases, two possible estimates may exist and a further TOA from a fourth gateway may be needed in order to get a final estimate of the target node. When the number of gateways available is more than three, the problem becomes an over-determined one. There are many academic research papers as well as patents addressing different methods to deal with the problem, including Maximum Likelihood algorithm, Least Mean Square Error algorithm, Weighted Least Mean Square Error algorithm, Least Median Error algorithm, and so on. There are also some investigations on the identification of the gateway with multipath delay from other gateways without multipath delay. The system and method presented in this invention falls into the general category of combined "Least Median Error" and "Least Mean Square Error" algorithms with multipath delay gateways identified and eliminated.

BRIEF SUMMARY OF THE INVENTION

It is an aim of the present invention to provide a system and method to achieve robust location estimation and immunity from multipath. The invention also includes a method to identify and eliminate the gateways with heaviest delay spread from the location algorithm to achieve even better accuracy.

The invention presents a novel system and procedure to compute the location estimate under the least median error criterion. It also introduces a technique to compute the TOA variation for each gateway and a scheme to identify and eliminate the gateways with most heavier multipath delay spread, so that only gateways without or with less severe multipath delay spread are used in location calculation to achieve improved accuracy.

The invention presents also an effective scheme for the fusion of TOA with RSSI (Received Signal Strength Indication) and SNR (Signal to Noise Ratio) metadata to improve the location accuracy over the pure TOA based method. Specifically the reliability of each TOA measurement is judged by checking the corresponding RSSI and SNR metadata. A TOA measurement will be used for TDOA calculation when the corresponding RSSI and SNR are over certain threshold values.

Further, the invention presents a novel approach to mitigate the bias in TOA from multipath delay spread. The invention presents a novel approach to compensate the bias in TDOA, which is originated from the bias in one or both TOA.

The invention also presents a novel technique to adaptively select or combine the location estimates from the least median error method and the weighted least mean square error method to achieve improved accuracy under various multipath channel conditions.

The invention presents a system and method to achieve robust and accurate location estimation utilising an extended least median error algorithm and by effectively identifying and eliminating the gateways with most significant multipath delay spread, so that only gateways without multipath, or with least multipath delay are used for location estimation.

DETAILED DESCRIPTION OF EMBODIMENTS OF THE INVENTION

Figure 1A:
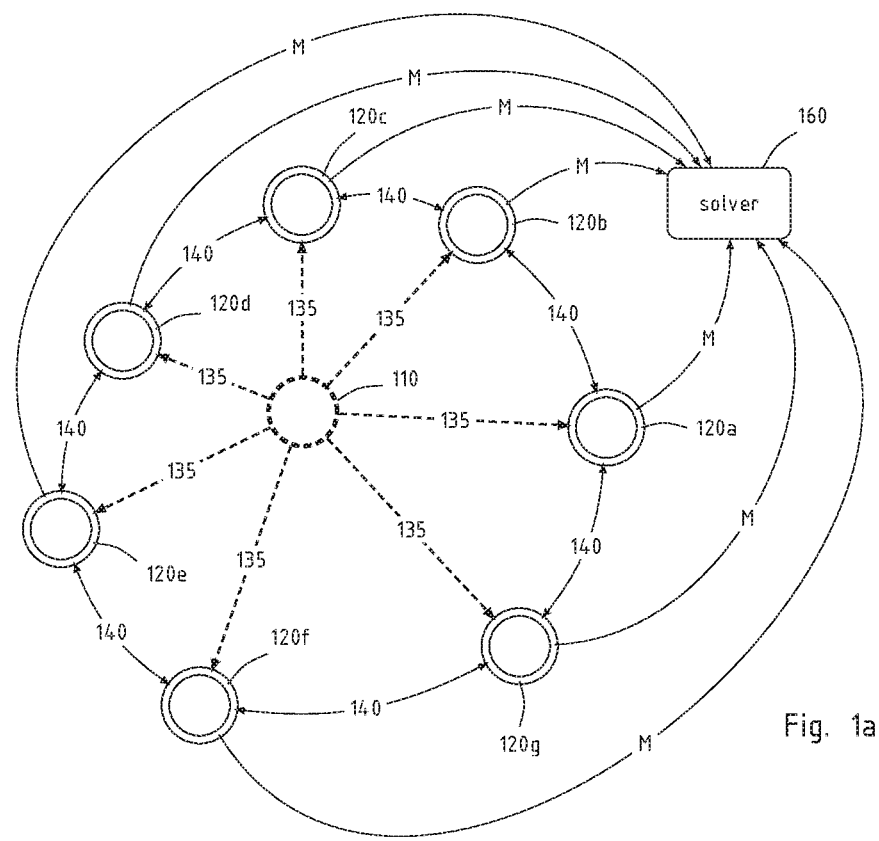
FIG. 1a illustrates in schematic simplified manner, a process of localization by which a plurality of synchronised gateways receive a localization packet transmitted by a mobile node and determine its location by means of a solver that processes the time of arrival of the packets as well as other metadata, such as RSSI and SNR at each gateway.
Figure 1B:
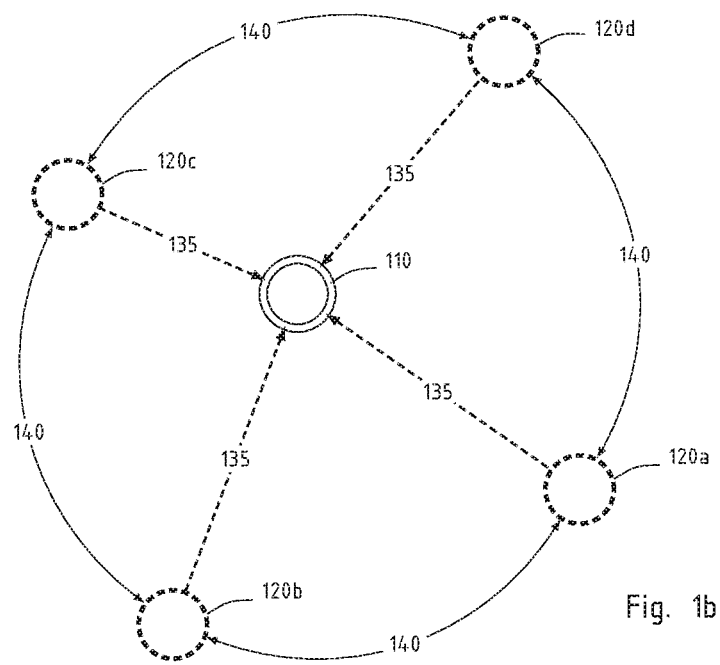
FIG. 1b illustrates, for completeness, the complementary case in which the gateways transmit simultaneous, our time-correlated, localisation packets to the mobile node that determines its own position based on their TOAs.

With reference to FIG. 1a, we will assume that a total of N gateways 120a-g receive the localization packet 135 transmitted by the target node 110 and, for each reception at each gateway, a measurement M that comprises the time of arrival of the signal (TOA) and preferably also an indication of the received signal strength (RSSI) and/or of the signal to noise ratio (SNR) for the receiving packet. Although TOA is a measurement of time, we here treat it as distance without loss of generality, based on the fact that the flight time multiplied by a known propagation speed equals to the flight distance.

It is assumed that the gateways 120a-g run on a common time reference, which is obtained by exchanging suitable synchronisation messages 140, or by referring to an external time reference, for example a signal received from geolocalization satellites. As mentioned above, several methods of providing synchronised references are known in the art, and the invention encompasses them all. It is explicitly intended that the invention could be based of synchronised ranging exchanges of chirp-modulated signals, as disclosed by WO2014124785 in the name of the applicant.

The measurements M including the TOA values along with RSSI and SNR are fed to a solver unit 160 that uses them to determine the position of the mobile point. The solver unit is represented as distinct from the gateways 12a-g in this example, but it could be part of one or several gateways as well, without departing from the scope of the invention.

It is quite common that multiple antenna and multiple transmissions are used in order to achieve improved accuracy through diversity. This is also important to the identification and elimination of gateways with heavier multipath delay presented in this invention. To further simplify the expression, however, the following mathematic treatment only considers the case in which each gateway has a single receiving antenna, and the target node transmits only one packet. It can be easily extended to multiple antennas and multiple transmissions cases. Based on this, we can outline the localisation task as below.

$GTW_i$ denotes the i-th gateway with known location (xi,yi); (i=0, ... N−1), $TOA_i$ is the packet arriving time measured at gateway $GTW_i$ (i=0, ... N−1).

First, select the gateway with the smallest TOA as the reference gateway, denoted as $GTW_O$.

Let $GTW_{i0}$ represent the arriving time difference between gateway $GTW_i$ (i=1, ... N−1) and reference gateway $GTW_O$. TDOA is obtained from the TOA measurement as below, $$TDOA_{i0}=(TOA_i-TOA_0); i=1,2, \ldots N-1$$

Preferably, the first step of the inventive method is TOA filtering and elimination, where TOA with its corresponding RSSI and/or SNR below determined threshold values will be treated as unreliable (likely with bigger error) estimates and will not be included for TDOA calculation.

Let (x,y) be the target node's location; we have then the following equations:

$$\sqrt{(x-x_i)^2+(y-y_i)^2}-\sqrt{(x-x_0)^2+(y-y_0)^2}=TDOA_{i0}; i=1,2, \ldots N-1$$

For a location estimate (x,y), $TDOA_{i0}$'s residue error is defined as:

$$(\sqrt{(x-x_i)^2+(y-y_i)^2}-\sqrt{(x-x_0)^2+(y-y_0)^2}-TDOA_{i0})^2$$

The Least Mean Square solution is the point (x,y) which minimises the sum of all the (quadratic) residue error terms, or the cost function as defined below $$\sum_{i=1}^{n-1}\left(\sqrt{(x-x_i)^2+(y-y_i)^2}-\sqrt{(x-x_0)^2+(y-y_0)^2}-TDOA_{10}\right)^2$$

The Least Square solution, however, has poor performance in the presence of outlier samples, which corresponds to the situation when some gateways have much heavier multipath delay spread than the rest.

According to an aspect of the present invention, the position of the mobile node 110 is estimated by a variant of an Extended Least Median (ELM) Error method to improve the robustness in presence of outliers.

Specifically all TDOA residue error terms will be sorted in ascending order. Different from the conventional Least Median method, which looks for solution that minimise the median point TDOA residue error, the method looks for solution which minimises the sum of TDOA residue errors from the first term in the sorted list to the median point.

While the above method will make the algorithm even more robust and free from the disturbance of outlier samples, the invention includes preferably also an efficient way to search for the best solution for the ELM method, as it will be detailed further on.

Preferably, the invention also includes steps to identify and eliminate the gateways with heaviest multipath delays, to further improve performance.

Location estimate is primarily based on the calculated TDOA from pairs of TOA, preferably after elimination of the TOA from the TDOA calculation by checking of the corresponding RSSI and SNR, as mentioned above.

In an advantageous variant, the invention also includes steps to mitigate the error introduced by different multipath delay spread on different gateways. Each TDOA is calculated as the difference of a pair of TOA from two different gateways. When more than one pair of TOA are available, for example, with multiple receiving antenna or multiple packet transmissions, there will be a list of TDOA produced relating to the targeting node at the same position. A simple method to deal with this diversity would be to calculate the average (or a weighted average) of the whole list of TDOA and use it as a single TDOA for location calculation.

Preferably, this invention first determines which of the two TOA used to calculate TDOA has bigger TOA deviation. When there are multiple receiving antenna, the TOA deviation can be calculated as there will be multiple TOA relating to the same gateways from a single packet transmission. A bigger TOA deviation is most likely relating to bigger multipath delay spread thus bigger bias. By knowing which of the TOA has bigger bias, the method of the invention determines whether the corresponding TDOA is having positive or negative net bias. The invention then sorts the whole list of TDOA in descending order and the final TDOA used for location calculation is obtained by a section of the whole sorted TDOA list for averaging. By shifting the central position and changing the length of the averaging section, the net positive or negative multipath bias in TDOA can be compensated or mitigated.

The invention also includes steps to adaptively select or combine the results from ELM and from the classic least mean square error method depending on the multipath channel types suffered from different gateways. It was found that, even when all gateways have comparable levels of multipath delay, the algorithm of the invention works considerably better than the least square method.

Figure 2A:
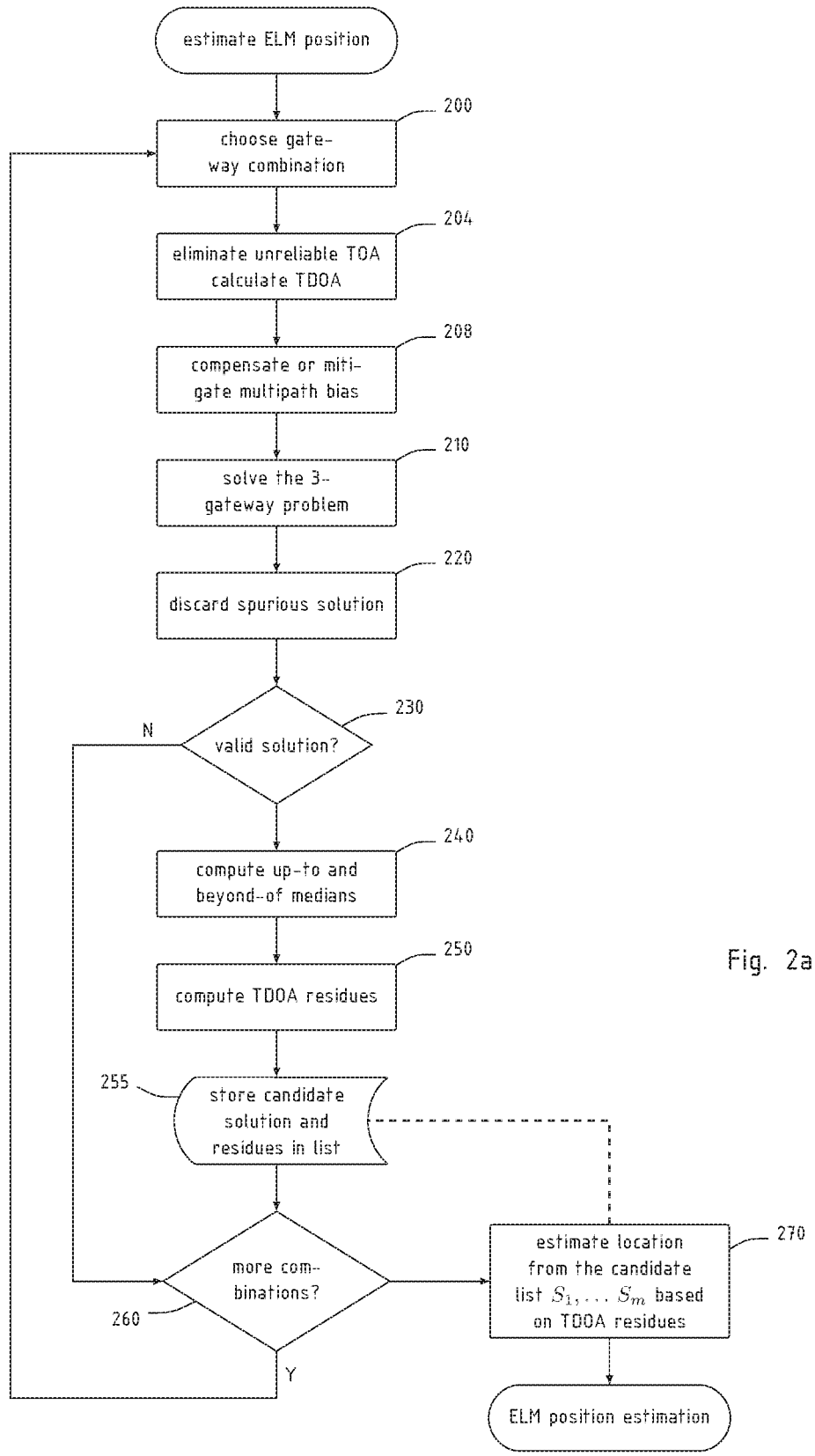
FIGS. 2a and 2b represent, by flowcharts, a possible implementation of the inventive method.

Steps of the inventive method will now be described with reference to FIGS. 2a-2b:

FIG. 2a illustrates a method of determining the position with a modified ELM algorithm according to an aspect of the invention. Initially (step 200) a combination of 3-gateway set is selected from the pool of N gateways. The 3-gateway set with known position allows the computation of two independent TDOA values (step 204), preferably after elimination of the unreliable TOA, based on their statistic deviations, which are sufficient for determining the position of the mobile node in two dimensions. In the case of multiple antenna or multiple packet transmissions, two list of TDOA can be obtained. The net positive or negative multipath bias in each TDOA list is identified and the operation to mitigate or compensate the bias is carried out as described before (step 208). After this, two TDOA without or with reduced bias are produced. From here, it is a simple 3-gateway TDOA location problem, where the location estimation can be achieved by directly solving of two hyperbolic equations as described above. In general, this process could yield two, one or none solutions (step 210).

In the general case of 3D navigation, three gateways alone are not sufficient to determine the position. The method of the invention is still applicable, either by raising the number of gateways in each considered combination, such as to have for each combination a solvable problem, or by using additional information, for example a partial knowledge of the position of node 110, or of the time at which the ranging message 135 was sent.

Should the 3-gateways problem gives two solutions, one can be eliminated (step 220) by several means, for example the most straightforward method is by checking the TDOA or the TDOA residue for the fourth or more extra gateways, or by comparing with previous known position. In some cases, the error on the TOA may be so severe that there is no valid solution at all. Up to now, none or one valid 3-gateway based location estimate is produced.

If there is a valid 3-gateway solution from step 220 (test (230)), the algorithm computes all combination of TDOA residue errors and sort them in ascending order.

From the sorted TDOA residue error list, the invention computes (step 240) an Up-To-Median point residue error, which is a sum of the first term (smallest residue error term) in the sorted list to the median point term.

Also in step 240, the method of the invention computes the Beyond-Median error, which is the Up-To-Median-Point error plus a determined number of terms further up in the sorted list.

Also in step 240, the method of the invention computes the Mean (all points) error, which is the sum of all TDOA residue errors in the sorted list. Further, the summation may exclude a determined number of terms with most significant TDOA residue errors to rule out some outliers.

Further, the Up-To-Median, the Beyond-Median and Mean residue error summations are divided by the corresponding number of summed terms to obtain the averaging TDOA residue errors, respectively.

The 3-gateway solution and the corresponding Up-To-Median, Beyond-Median and Mean square errors will be needed later on and are stored in a candidate list or another suitable data structure (step 255).

Steps 200-250 are repeated for all possible combination of 3 gateways from the pool (loop terminated by decision 260). This will create a candidate list consisting of all 3-gateway based location estimates. Then, the algorithm estimates the location of the target node from the candidate list based on the TDOA residue errors. In a possible realization of this step, the position could be the solution which has the least Up-To-Median error, or that which has the least Beyond-Median error, or that which has the least Mean error. The procedure to decide which of the 3 possible solutions to be the ELM position output can be based on the check of the overall TDOA residue errors for the 3 possible solutions.

Figure 2B:
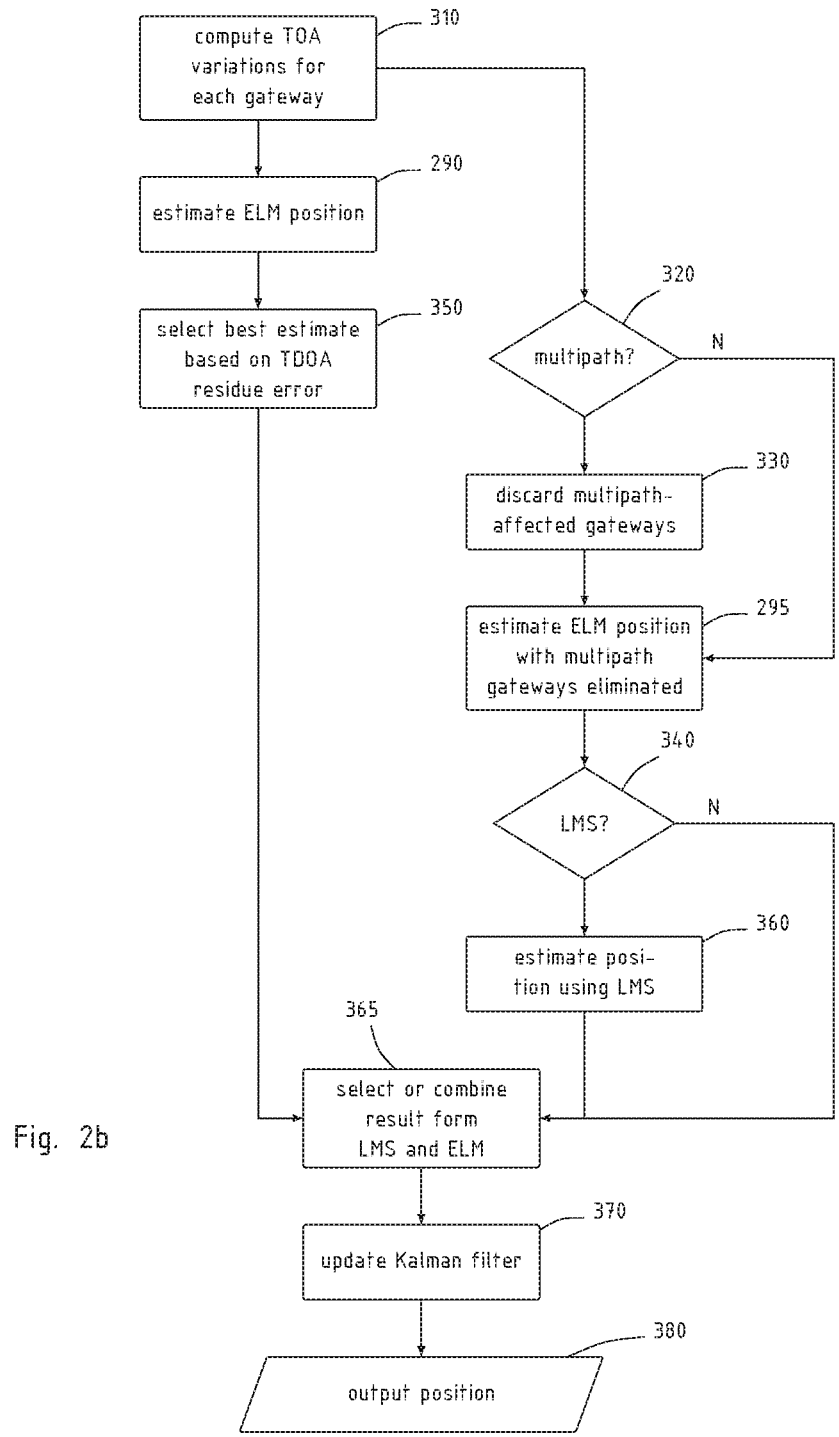

FIG. 2b illustrates the process of position determination at a higher level. Initially (step 310), TOA variations are computed for each gateway. TOA variations will be used for the identification and elimination of multipath gateways as in 320 and 330.

Later (step 290) the system determines the ELM solution by using for example the steps described in FIG. 2a and selects, as already mentioned, the best ELM estimate of the position based on TDOA residue errors.

Preferably, the method of the invention also includes, under ELM, steps to determine whether multipath delay is present and which gateways are most affected by multipath delay (step 320). A possible manner of detecting multipath in gateways is to compare TOA variation from each gateway with a given threshold.

The gateways, identified as having excessive multipath delay spread are eliminated from the active gateways list (step 330) and the ELM position is estimated again (step 295). Preferably, the algorithm will keep at least a minimum number of gateways (typically 4), in the active gateway list.

The method of the invention also includes the elimination of unreliable TOA from TDOA calculation, based on the checking of the corresponding RSSI and SNR against certain threshold values.

The invention also includes the method to mitigate or compensate the bias in TDOA originated from the different multipath delay spread in TOA from different gateways.

Preferably, the method of the invention includes also a step 340, where by checking TOA variation from each gateway, a decision is made whether to carry out the Least Mean Square (LMS) determination to improve location accuracy. In general, LMS determination can lead to good performance when the TOA variations across all active gateways have comparable value, i.e., all gateways have comparable multipath delay spread. If the decision in 340 is yes, the LMS determination is carried out using all gateways available in 360.

Preferably, in the case where the altitudes of gateway antenna and of the mote are significantly different, the 2D based method will incur location error due to the TOA measured in 3D coordinating system is used in 2D coordinating system. If the mote's altitude is known through other device, for example, the air pressure measurement, the invention includes a method to compensate the TOA measurement bias originated from the altitude difference among gateways and the mote.

Further, the invention includes a recursive method to use known gateways and mote's altitude information along with the estimated mote location to compensate the bias in TOA measurement to achieve improved location estimate without or with reduced bias from altitude difference.

Finally, the algorithm selects either the ELM solution or the LMS solution, or a combination of them (step 365), and outputs the final position. Up to this point, a one-shot estimate of the target node's location based on one or several packets is obtained. In the case that the target node makes more successive transmissions, more successive one-shot ELM estimates of the target node's location can be produced. All these one-shot estimates can be fed to a tracking algorithm, for example a Kalman filter 370 or another suitable algorithm, to track the movement of the target node or to improve the location accuracy if the target node is staying static.

Simulations have shown that the system can achieve robust and efficient location estimation for gateways suffering from various multipath delay spreads. In the case all gateways have the same or close level of delay spread, the algorithm is shown to be stable and produce at least the same accuracy as the conventional LMS method. The system addresses the 2-D location estimate problem, but the idea can be easily extended to deal with 3-D location estimation.

The system and method in this invention delivers much better location accuracy than the Least Mean Square method in the presence of large but uneven multipath delay spread across different receiving gateways. The extended Least Median algorithm achieves good performance with low complexity. Combined with the unique heavy-multipath-delayed gateway identification and elimination technique, the method of fusion of TOA with RSSI and SNR to eliminate unreliable TOA, and the method to mitigate and compensate multipath bias in TDOA calculation, the whole system achieves even better performance than the simple Least Median Square and Least Mean Square methods.

The invention claimed is:

1. A system comprising:
at least a target node or mobile device and a plurality of gateways whose positions are known, wherein the gateways are operatively arranged to determine for each gateway a time difference of arrival of a signal originated from the mobile device, or the mobile device is operatively arranged to determine for each gateway a time difference of arrival of synchronised signals originated from the gateways;
the system further comprising a solver unit operatively arranged to compute a position of the mobile device, based on said time difference of arrival. wherein the solver unit is arranged to produce a list of candidates. each candidate comprising a location estimate based on combination of three or more gateways selected among the gateways and time-difference of arrival (TDOA) residue errors, and to estimate a location of the mobile device choosing one of the location estimates in the position candidate list based on the time-difference of arrival (TDOA) residue errors, wherein the solver unit is arranged to select candidates of the candidate list in turn and compute, for each selected candidate, an up-to median error consisting in a sum of time-difference of arrival (TDOA) residue errors smaller and up to a median residue error among the time-difference of arrival (TDOA) residue errors of the selected candidate, and to estimate the location of the mobile device choosing the location estimate of the candidate that has the least up-to-median error.

2. A system comprising:
at least a target node or mobile device and a plurality of gateways whose positions are known, wherein the gateways are operatively arranged to determine for each gateway a time difference of arrival of a signal originated from the mobile device, or the mobile device is operatively arranged to determine for each gateway a time difference of arrival of synchronised signals originated from the gateways;
the system further comprising a solver unit operatively arranged to compute a position of the mobile device, based on said time difference of arrival, wherein the solver unit is arranged to produce a list of candidates, each candidate comprising a location estimate based on a combination of three or more gateways selected among the gateways and time-difference of arrival (TDOA) residue errors, and to estimate a location of the mobile device choosing one of the location estimates in the position candidate list based on the time-difference of arrival (TDOA) residue errors, wherein the solver unit is arranged to select candidates of the candidate list in turn and compute for each selected candidate a beyond-median error consisting in a sum of time-difference of arrival (TDOA) residue errors smaller and up to a median residue error, plus a determined number of time difference of arrival (TDOA) residue errors further up in a sorted list of time difference of arrival (TDOA) residue errors, and to estimate the location of the mobile device choosing the location estimate of the candidate that has the least beyond-median error.

3. A system comprising:
at least a target node or mobile device and a plurality of gateways whose positions are known, wherein the gateways are operatively arranged to determine for each gateway a time difference of arrival of a signal originated from the mobile device. or the mobile device is operatively arranged to determine for each gateway a time difference of arrival of synchronised signals originated from the gateways;
the system further comprising a solver unit operatively arranged to compute a position of the mobile device, based on said time difference of arrival, wherein the solver unit is arranged to produce a list of candidates. each candidate comprising a location estimate based on a combination of three or more gateways selected among the gateways and time-difference of arrival (TDOA) residue errors, and to estimate a location of the mobile device choosing one of the location estimates in the position candidate list based on the time-difference of arrival (TDOA) residue errors, wherein the solver unit is arranged to select candidates of the candidate list in turn and compute for each selected candidate a mean error consisting in a mean of time-difference of arrival (TDOA) residue errors, and to estimate the location of the mobile device choosing the location estimate of the candidate that has the least mean error.

4. The system of claim 3, further arranged to compute a time of arrival (TOA) variation of each gateway and discard gateways most affected by multipath delay based thereupon.

5. A system comprising:
at least a target node or mobile device and a plurality of gateways whose positions are known, wherein the gateways are operatively arranged to determine for each gateway a time difference of arrival of a signal originated from the mobile device, or the mobile device is operatively arranged to determine for each gateway a time difference of arrival of synchronised signals originated from the gateways;
the system further comprising a solver unit operatively arranged to compute a position of the mobile device, based on said time difference of arrival, wherein the solver unit is arranged to produce a list of candidates. each candidate comprising a location estimate based on a combination of three or more gateways selected among the gateways and time-difference of arrival (TDOA) residue errors, and to estimate a location of the mobile device choosing one of the location estimates in the position candidate list based on the time-difference of arrival (TDOA) residue errors, wherein the solver unit is further arranged to eliminate unreliable time of arrival (TOA) based on respective received signal strength indication (RSSI) and signal to noise ratio (SNR) metadata.

6. A method of determining the position of a mobile device relative to a plurality of gateways whose positions are known, comprising:
determining for each gateway a time difference of arrival of a signal originated from the mobile device, or for each gateway a time difference of arrival of synchronised signals originated, from the gateways to the mobile device:
computing the position of the mobile device, based on said time difference of arrival,
producing a list of candidates, each candidate comprising a location estimate based on a combination of three or more gateways selected among the gateways and time-difference of arrival (TDOA) residue errors, and estimating a location of the mobile device choosing one of the location estimates in the position candidate list based on the time-difference of arrival (TDOA) residue errors, further comprising selecting candidates of the candidate list in turn, computing, for each selected candidate, an up-to median error consisting in a sum of time-difference of arrival (TDOA) residue errors smaller and up to a median residue error among the time-difference of arrival (TDOA) residue errors of the selected candidate, and estimating the position of the mobile device choosing the location estimate of the candidate that has the least up-to-median error.

7. A method of determining the position of a mobile device relative to a plurality of gateways whose positions are known, comprising:
determining for each gateway a time difference of arrival of a signal originated from the mobile device, or fir each gateway a time difference of arrival of synchronised signals originated from the gateways to the mobile device:
computing the position of the mobile device, based on said time difference of arrival,
producing a list of candidates, each candidate comprising a location estimate based on a combination of three or more gateways selected among, the gateways and time-difference of arrival (TDOA) residue errors, and estimating a location of the mobile device choosing one of the location estimates in the position candidate list based on the time-difference of arrival (TDOA) residue errors, further comprising selecting candidates of the candidate list in turn, computing for each selected candidate a beyond-median error consisting in a sum of time-difference of arrival (TDOA) residue errors smaller and up to a median residue error, plus a determined number of time difference of arrival (TDOA) residue errors further up in a sorted list of time difference of arrival (TDOA) residue errors, and estimating the location of the mobile device choosing the location estimate of the candidate that has the least beyond-median error.

8. A method of determining the position of a mobile device relative to a plurality of gateways whose positions are known, comprising:
determining for each gateway a time difference of arrival of a signal originated from the mobile device or for each gateway a time difference of arrival of synchronised signals originated from the gateways to the mobile device;
computing the position of mobile device, based on said time difference of arrival,
producing a list of candidates, each candidate comprising a location estimate based on a combination of three or more gateways selected among the gateways and time-difference of arrival (TDOA) residue errors, and estimating a location of the mobile device choosing one Of the location estimates in the position candidate list based on the time-difference of arrival (TDOA) residue errors, further comprising selecting candidates of the candidate list in turn, computing for each selected candidate a mean error consisting in a mean of time-difference of arrival (TDOA) residue errors, and estimating the location of the mobile device choosing the location estimate of the candidate that has the least mean error.

9. The method of claim 8, further comprising computing a time of arrival (TOA) variation for each gateway, and discarding gateways most affected by multipath delay based on a procedure of checking time of arrival (TOA) variation across all gateways.

10. A method of determining the position of a mobile device relative to a plurality of gateways whose positions are known, comprising:
determining for each gateway a time difference of arrival of a signal originated from the mobile device, or for each gateway a time difference of arrival of synchronised signals originated from the gateways to the mobile device;
computing the position of the mobile device, based on said time difference of arrival,
producing a list of candidates. each candidate comprising a location estimate based on a of three or more gateways selected among the gateways and time-difference of arrival (TDOA) residue errors, and estimating a location of the mobile device choosing one of the location estimates in the position candidate list based on the time-difference of arrival (TDOA) residue errors, further arranged to eliminate unreliable time of arrival (TOA) based on respective received signal strength indication (RSSI) and signal to noise ratio (SNR) metadata.

11. A method of determining the position of a mobile device relative to a plurality of gateways whose positions are known, comprising:
- determining for each gateway a time difference of arrival of a signal originated from the mobile device, or for each gateway a time difference of arrival of synchronised signals originated from the gateways to the mobile device;
- computing the position of the mobile device, based on said time difference of arrival,
- producing a list of candidates, each candidate comprising a location estimate based on a combination of three or more gateways selected among the gateways and time-difference of arrival (TDOA) residue errors, and estimating a location of the mobile device choosing, one of the location estimates in the position candidate list based on the time-difference of arrival (TDOA) residue errors, further arranged to compensate a bias in time of arrival (TOA)/ time differences of arrival (TDOA) originated from a difference of altitude among gateways and the mobile device, to improve a 2D based location accuracy, should the mobile device's altitude information is available.

* * * * *